United States Patent [19]

Nakamura

[11] Patent Number: 5,734,330
[45] Date of Patent: Mar. 31, 1998

[54] ANTI-THEFT CAR PROTECTION DEVICE

[75] Inventor: Shiroh Nakamura, Tokyo, Japan

[73] Assignee: Calsonic Corporation, Tokyo, Japan

[21] Appl. No.: 540,073

[22] Filed: Oct. 6, 1995

[30] Foreign Application Priority Data

Oct. 11, 1994 [JP] Japan .................................. 6-245032
Oct. 11, 1994 [JP] Japan .................................. 6-245033

[51] Int. Cl.⁶ .............................. G06F 7/04; B06R 25/04; B06R 25/10
[52] U.S. Cl. .............................. 340/825.31; 340/825.34; 340/825.72; 307/10.2; 307/10.5; 307/9.1; 364/424.045
[58] Field of Search .................. 340/825.31, 825.34, 340/825.72; 307/10.2, 10.3, 10.4, 10.5, 9.1, 10.6; 364/424.045; 180/287, 237; 70/252

[56] References Cited

U.S. PATENT DOCUMENTS

| | | | |
|---|---|---|---|
| 4,672,225 | 6/1987 | Hanisko et al. | 307/10 AT |
| 4,965,460 | 10/1990 | Tanaka et al. | 307/10.2 |
| 4,990,906 | 2/1991 | Kell et al. | 340/825.31 |
| 5,043,593 | 8/1991 | Tsutsumi et al. | 307/10.2 |
| 5,508,691 | 4/1996 | Castleman et al. | 340/825.31 |
| 5,606,306 | 2/1997 | Mutoh et al. | 340/426 |

FOREIGN PATENT DOCUMENTS

| | | |
|---|---|---|
| 0 503 695 | 9/1992 | European Pat. Off. . |
| 43 41 333 | 6/1995 | Germany . |
| 64-56249 | 3/1989 | Japan . |

*Primary Examiner*—Michael Horabik
*Assistant Examiner*—Yonel Beaulieu
*Attorney, Agent, or Firm*—Foley & Lardner

[57] ABSTRACT

An anti-theft car protection device includes a key having an IC-chip embedded therein, and an ignition switch that can be turned by the key to any "OFF" position, an "ACC" position and an "ON" position. The device further includes an antenna mounted near the ignition switch, and a communication module that provides a radio communication between the IC-chip of the key and the antenna. The device also includes an immobilizer controller that determines, in accordance with an instruction signal issued from the communication module, whether or not the engine should be started. The communication module includes an electric field generating circuit that energizes the IC-chip of the key by causing the antenna to emit an electromagnetic wave, a transmitting/receiving circuit that carries out exchange of ID-codes with the IC-chip through the antenna, and a system control circuit that controls both the electric field generating circuit and the transmitting/receiving circuit.

14 Claims, 7 Drawing Sheets

ANTI-THEFT CAR PROTECTION DEVICE

BACKGROUND OF THE INVENTION

1. Field of the Invention

The present invention relates to anti-theft car protection devices, and more particularly to anti-theft car protection devices of a type that positively immobilize the engine of a car when starting of the engine is intended by using an illegal key.

2. Description of the Prior Art

One of the anti-theft car protection devices of the above-mentioned type is shown in Japanese Patent First Provisional Publication 64-56249. In the device of this publication, a small transmitter is installed in a grip portion of a key, and a controller is mounted in a car. That is, only when an ID-code carried by a signal emitted from the transmitter coincides with an ID-code memorized by the controller, starting of the engine is permitted. Thus, even if a copy key similar to the proper key is used, the engine can not be started so long as the ID-code possessed by the transmitter of the copy key fails to coincide with the ID-code of the controller.

However, in the above-mentioned conventional car protection device, the ID-code provided by the transmitter of the key is a fixed code. That is, the ID-code of the transmitter is unchanged in value throughout usage of the same. This means that the ID-code of the transmitter can be readily decoded or known by an outsider when the key has been carelessly left in an open place. By decoding the ID-code, the outsider can produce a duplicate of the proper key, which emits the same ID-code. In this case, the engine can be easily started by the outsider by using the illegally produced duplicate key. Of course, in this case, the anti-theft car protection device can not exhibit its normal function.

SUMMARY OF THE INVENTION

It is therefore an object of the present invention to provide an anti-theft car protection device which is free of the above-mentioned drawback.

According to the present invention, there is provided an anti-theft car protection device that can exhibit its normal function even when an ID-Code possessed by the transmitter of the proper key is decoded or known by an outsider.

According to the present invention, there is further provided a method of initializing the anti-theft car protection device.

According to a first aspect of the present invention, there is provided an anti-theft car protection device, which comprises a key having an IC-chip embedded therein; a first structure mounted in a motor vehicle, the first structure including an ignition switch that can be turned by the key to "OFF" position, "ACC" position and "ON" position; an antenna mounted on the first structure near the ignition switch; a communication module mounted on the first structure to provide a radio communication between the IC-chip of the key and the antenna; and an immobilizer controller mounted on the first structure to determine, in accordance with an instruction signal issued from the communication module, whether the engine should be started or not, wherein the communication module includes an electric field generating circuit that energizes the IC-chip of the key by causing the antenna to emit an electromagnetic wave, a transmitting/receiving circuit that carries out exchange of ID-codes with the IC-chip through the antenna, and a system control circuit that controls both the electric field generating circuit and the transmitting/receiving circuit, and wherein the system control circuit issues an engine start permitting signal to the immobilizer controller to permit the engine to start only when, with the ignition switch having been turned to the "ACC" position by the key to cause the electric field generating circuit to energize the IC-chip, an ID-code received by the transmitting/receiving circuit from the IC-chip coincides with an ID-code previously memorized in the system control circuit, and wherein the system control circuit transmits, with an aid of the transmitting/receiving circuit, to the IC-chip a new ID-code to write the same to the IC-chip and memorizes the new ID-code in the system control circuit.

According to a second aspect of the present invention, there is provided a method of initializing an anti-theft car protection device, the anti-theft car protection device comprising a key having an IC-chip embedded therein; a first structure mounted in the motor vehicle, the first structure including an ignition switch that can be turned by the key to "OFF" position, "ACC" position and "ON" position; an antenna mounted on the first structure near the ignition switch; a communication module mounted on the first structure to provide a radio communication between the IC-chip of the key and the antenna; and an immobilizer controller mounted on the first structure to determine, in accordance with an instruction signal issued from the communication module, whether the engine should be started or not, wherein the communication module includes an electric field generating circuit that energizes the IC-chip of the key by causing the antenna to emit an electromagnetic wave, a transmitting/receiving circuit that carries out exchange of ID-codes with the IC-chip through the antenna, and a system control circuit that controls both the electric field generating circuit and the transmitting/receiving circuit, and wherein the system control circuit issues an engine start permitting signal to the immobilizer controller to permit the engine to start only when, with the ignition switch having been turned to the "ACC" position by the key to cause the electric field generating circuit to energize the IC-chip, an ID-code received by the transmitting/receiving circuit from the IC-chip coincides with an ID-code previously memorized in the system control circuit. The method comprises the steps of (a) preparing a key having an IC-chip fixed thereto, the IC-chip having a given ID-code written thereto; (b) mounting the communication module on a vehicle without permitting the system control circuit to memorize the given ID-code; (c) turning the ignition switch to the "ACC" position by using the key thereby to transmit the given ID-code of the IC-chip of the key to the transmitting/receiving circuit; (d) permitting the system control circuit to memorize the given ID-code therein; and (e) removing the key from the ignition switch.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
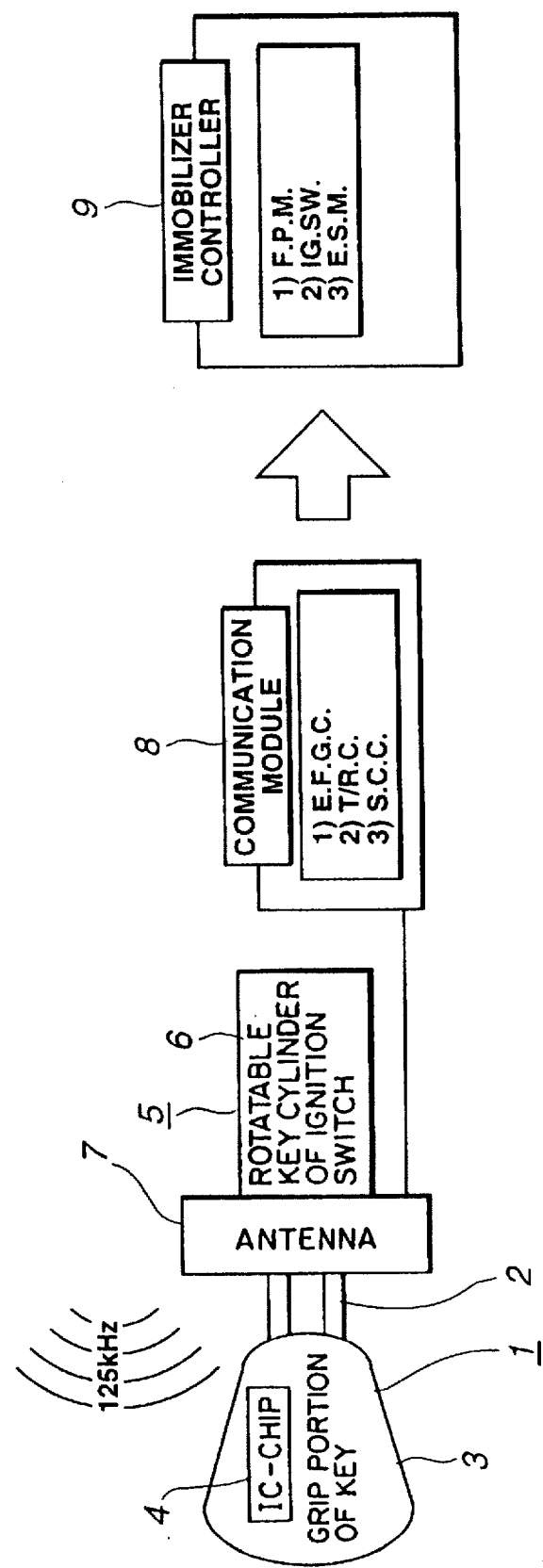
FIG. 1 is a block diagram of an anti-theft car protection device of a first embodiment of the present invention.
Figure 2A:
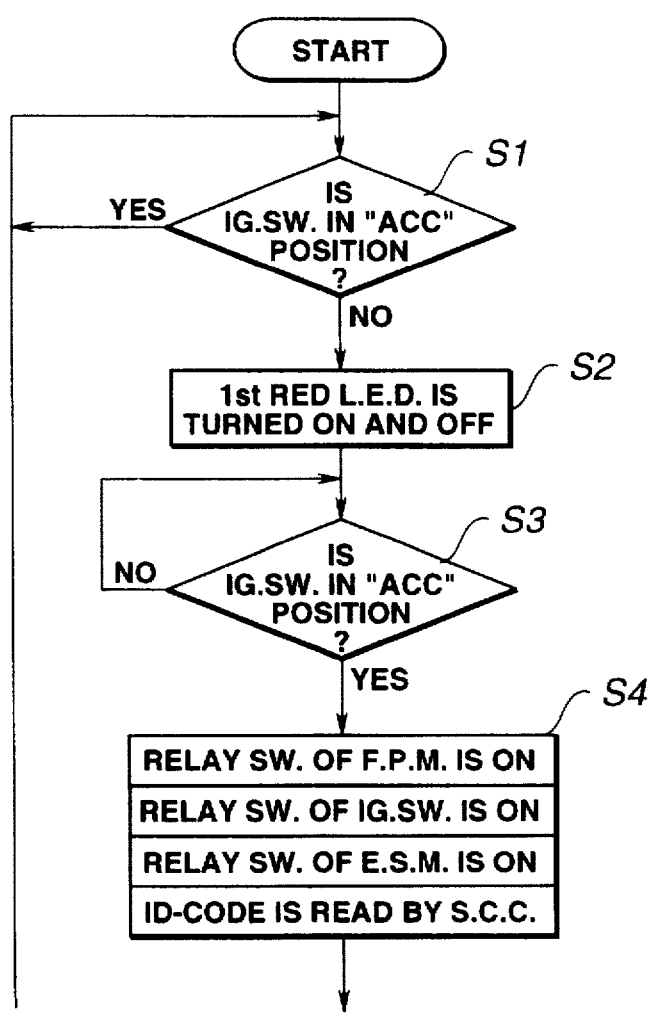
FIGS. 2A and 2B show a flowchart that depicts programmed operation steps carried out by a control unit employed in the first embodiment of the present invention.
Figure 2B:
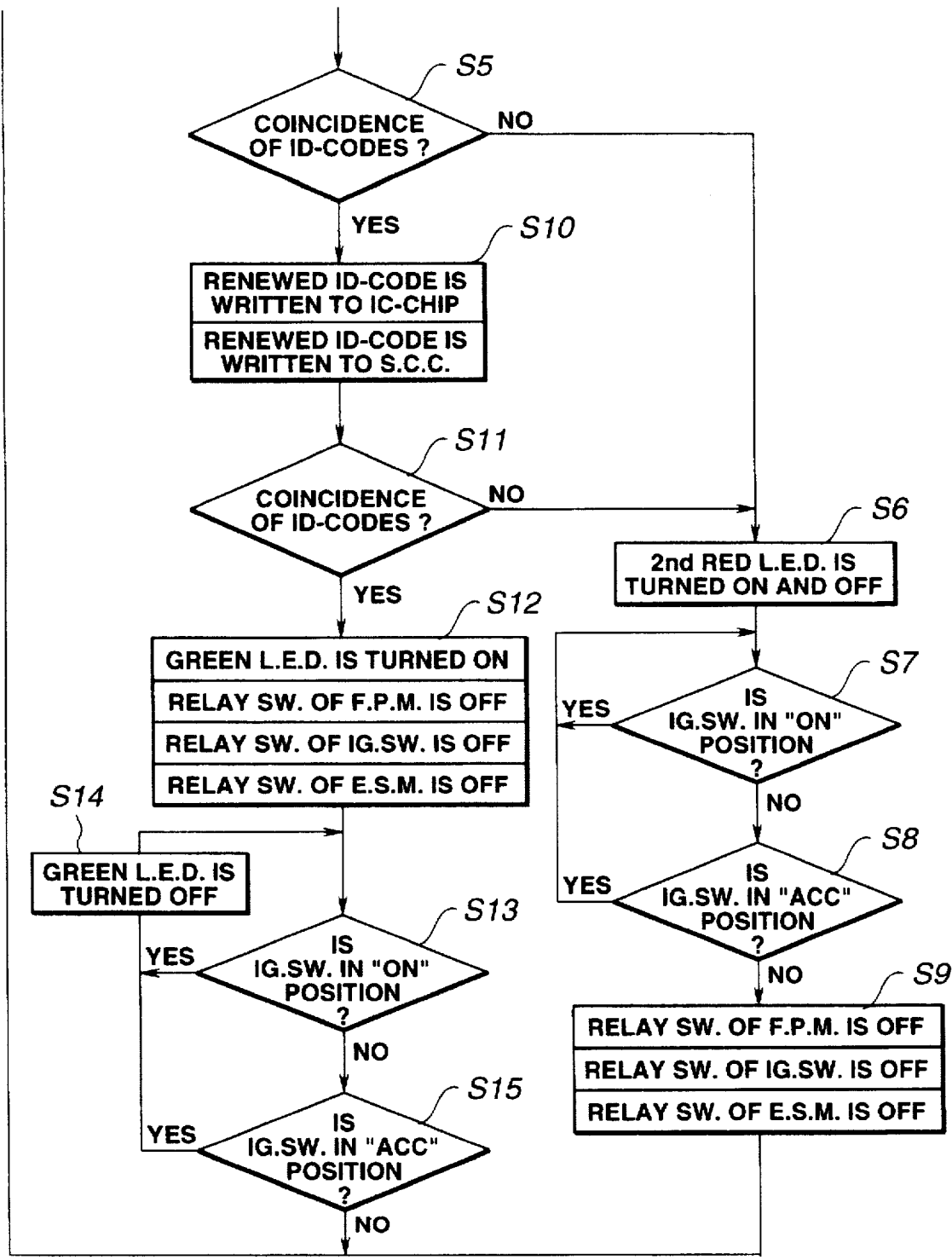

Referring to FIGS. 1, 2A and 2B, there is shown a first embodiment of the present invention, which is an improved anti-theft car protection device.

In FIG. 1, denoted by numeral 1 is a key which comprises an elongated work portion 2 and an enlarged grip portion 3. An IC-chip 4 is embedded in the grip portion 3 of the key 1. As will become apparent as the description proceeds, the IC-chip 4 has a communication facility as well as a memorizing facility.

Denoted by numeral 5 is an ignition switch that is usually mounted on a dashboard of the vehicle. The ignition switch 5 has a rotatable key cylinder 6 incorporated therewith. The key cylinder 6 has a slit into which the elongated work portion 2 of the key 1 can be inserted. As is known, when the ignition switch 5 assumes its "OFF" position, insertion of the key 1 (more specifically, the elongated work portion 2 of the key 1) into the key cylinder 6 is permitted. When then the key 1 is turned clockwise, the ignition switch 5 comes to "ON" position through "ACC" position, and when the key 1 is further turned in the same direction, the ignition switch 5 comes to "START" position to energize an engine starter motor for starting the engine.

Near the ignition switch 5, there is arranged an antenna 7 for effecting a radio communication with the IC-chip 4 in an after-mentioned manner. In fact, when the IC-chip 4 nears the antenna 7 by about 2 or 3 cm, the radio communication is established. The communication between the IC-chip 4 and the antenna 7 is conducted by a communication module 8. Based on the communication with the IC-chip 4, the communication module 8 issues an instruction signal to an immobilizer controller 9. Based on the instruction signal from the communication module 8, the immobilizer controller 9 carries out a judgment as to whether or not the engine should be started.

In the illustrated embodiment, based on the instruction signal from communication module 8, the immobilizer controller 9 controls a fuel pump motor, the ignition switch 5 and the engine starter motor. That is, when the immobilizer controller 9 judges that the engine should not be started, the fuel pump motor is not energized, the ignition switch 5 becomes inoperative and the engine starter motor is not energized. With these "OFF" and inoperative conditions, starting of the engine is inhibited. Of course, the inhibition of the engine starting is effected by turning OFF either the fuel pump motor, the ignition switch 5 the engine starter motor. However, for more effective anti-theft function, turning off all three of the devices is preferable.

The communication module 8 comprises an electric field generating circuit, a transmitting/receiving circuit and a system control circuit. Upon operation of the electric field generating circuit, the antenna 7 emits a certain electromagnetic wave by which a power part of the IC-chip 4 generates an electric power. That is, if the antenna 7 emits an electromagnetic wave having a certain frequency (for example 125 kHz), the power part of the IC-chip 4 is resonated to thereby generate an electric power. With this electric power generated, the radio communication between the IC-chip 4 and the antenna 7 becomes possible. The transmitting/receiving circuit carries out exchange of ID-codes (more specifically, signals carrying ID-codes) with the IC-chip 4.

The system control circuit controls both the electric field generating circuit and the transmitting/receiving circuit, and issues an instruction signal to the immobilizer controller 9.

When the key 1 is inserted into the key cylinder 6 and the ignition switch 5 is turned to "ACC" position, the system control circuit drives the electric field generating circuit for emitting a certain electromagnetic wave from the antenna 7. In addition to this, the system control circuit compares an ID-code carried by the signal from the IC-chip 4 with an ID-code that has been memorized therein. Only when these ID-codes coincide with each other, the system control circuit issues to the immobilizer controller 9 an instruction signal to permit the engine starting. At the same time, the system control circuit drives the transmitting/receiving circuit to transmit to the IC-chip 4 a signal which carries a new ID-code. The new ID-code is written to the IC-chip 4 and memorized in the system control circuit.

In practice, the communication module 8 and the immobilizer controller 9 are incorporated with a computer-aided control unit.

Referring to FIGS. 2A and 2B, there is shown a flowchart that depicts programmed operation steps carried out in the computer-aided control unit employed in the first embodiment. The flowchart is described with respect to a condition wherein the control of the fuel pump motor, the ignition switch 5 and the engine starter motor for inhibiting the engine starting is carried out by respective relay switches of a normally closed type.

At step S1, a judgment is carried out as to whether the ignition switch 5 assumes "ACC" position or not. If NO, that is, when the ignition switch 5 does not assume "ACC" position, the operation flow goes to step S2. At this step, a first red light emitting diode (1'st LED(R)) mounted on a dashboard of the vehicle is turned on and off, letting a driver know that the anti-theft car protecting device is not ready for operation.

Then, the operation flow goes to step S3. At this step, the same judgment as the step S1 is carried out. If "YES", that is, When the ignition switch 5 has come to "ACC" position, the operation flow goes to step S4. At this step, the respective (viz., three) relay switches of the fuel pump motor, the ignition switch 5 and the engine starter motor are all energized (ON), thereby assuming their "OPEN" positions. Under this condition, the fuel pump motor, the ignition switch 5 and the engine starter motor are deenergized or inoperative, and thus the engine starting is inhibited.

Furthermore, at the step S4, a radio communication is carried out between the IC-chip 4 (PIT) and the antenna 7. With this communication, an ID-code written to the IC-chip 4 is transmitted to the system control circuit through the transmitting/receiving circuit and read by a judging part of the system control circuit.

Then, at step S5, the judging part judges whether or not the ID-code from the IC-chip 4 coincides with an ID-code which has been memorized in a memorizing portion of the judging part. If NO, that is, when these two ID-codes do not coincide with each other, the operation flow goes to step S6 without deenergizing the three relay switches (that is, without permitting the engine to start). At the step S6, a second red light emitting diode (2'nd LED(R)) mounted on the dashboard of the vehicle is turned on and off, letting a driver know that the two ID-codes do not coincide with each other, that is, the key 1 which has been put in the key cylinder is not a proper key.

This condition is continued until the ignition switch 5 is turned back to "OFF" position by the key 1. That is, when the two ID-codes do not coincide, the operation flow goes to step S7 to judge whether the ignition switch 5 is in "ON" position or not. If NO, that is, when the ignition switch 5 does not assume "ON" position, the operation flow goes to step S8 to judge whether or not the ignition switch 5 is in "ACC" position. If "NO", that is, when it is judged that the ignition switch 5 does not take "ON" position nor "ACC" position, the operation flow goes to step S9 to deenergize the three relay switches, which establishes operative conditions of the fuel pump motor, the ignition switch 5 and the engine starter motor. However, since, under this condition, the ignition switch 5 has been turned back to "OFF" position by the key 1, the engine is not operated or started.

While, if YES at step S5, that is, when it is judged that the ID-code from the IC-chip 4 coincides with the memorized ID-code, the operation flow goes to step S10 to renew the ID-code. That is, in this embodiment, there are employed two types of ID-codes, one being a fixed ID-code of 24-digit in binary notation and the other being a variable ID-code of 24-digit in binary notation. The fixed ID-code is kept unchanged. While, the variable ID-code is renewed or changed each time an action for starting the engine is carried out. The judging part of the system control circuit judges the ID-code coincidence only when the two types of ID-codes make their coincidences. For obtaining the variable ID-code, the system control circuit has a random number generating section installed therein.

At step S10, a renewed variable ID-code obtained through the random number generating section is written to both the IC-chip 4 and the judging part of the system control circuit. The renewed variable ID-code written to the IC-chip 4 is instantly transmitted through the transmitting/receiving circuit to the judging part and read by the same. Then, at step S11, a judgment is carried out as to whether or not the renewed variable ID-code from the IC-chip 4 coincides with the renewed variable ID-code which has been directly written to the judging part. If "NO", that is, when the two renewed variable ID-codes fail to coincide, the operation flow goes to the aforementioned step S6 judging that any trouble would occur in either of the IC-chip 4 and the judging part. Then, through the above-mentioned steps S7 and S8, the operation flow goes to step S9 to deenergize the three relay switches with the ignition switch 5 having been turned to "OFF" position. In this case, repairing of the damaged portion is needed for starting the engine.

While, if "YES" at step S11, that is, when the renewed variable ID-code from the IC-chip 4 and the renewed variable ID-code on the judging part are matched, the operation flow goes to step S12.

It is to be noted that under this condition, the ID-codes (viz., renewed ID-codes) memorized in the IC-chip 4 and the judging part are different from those set when an action for starting the engine was practically made. This is because of the renewal of the variable ID-code section in the ID-code in each of the IN-chip 4 and the judging part. The renewed ID-codes are subjected to the ID-coincidence judgment at step S5 in a subsequent action for the engine starting.

At step S12, a green light emitting diode (LED(G)) mounted on the dashboard is turned ON, and the three relay switches are deenergized to assume their "CLOSE" positions. As a result, the engine becomes ready for starting. Then, at step S13, a judgment is carried out as to whether the ignition switch 5 has come to "ON" position or not. If YES, that is, when it is judged that the ignition switch 5 has come to "ON" position, the green light emitting diode (LED(G)) is turned OFF at step S14, letting the driver know that the engine starting has been practically made. Furthermore, if, at step S15, it is judged that the ignition switch 5 has come to "ACC" position, the green light emitting diode (LED(G)) is also turned OFF. When the ignition switch 5 is turned to "OFF" position, the operation flow goes back to step S1 through step S13 and S15.

As is described hereinabove, in the first embodiment of the present invention, only when the ID-code issued from the IC-chip 4 embedded in the key 1 is in coincidence with the ID-code memorized in the system control circuit of the communication module 8, starting of the engine is permitted. Furthermore, in the first embodiment, the ID-code is renewed each time an action for starting the engine is carried out. Accordingly, even when the ID-code is decoded or known by an outsider at a certain point of time, he or she cannot start the engine by using the ID-code so long as the engine has been started at least one time by using a proper key thereafter.

In order to practically use duplicate keys, the judging part of the system control circuit is designed to memorize ID-codes by the number of the duplicate keys. When the engine starting is intended by one of the duplicate keys, only the ID-code possessed by the key is renewed and the other ID-codes are kept unchanged. For achieving this, the IC-chip 4 of each duplicate key is designed to issue its own discrimination code as well as the ID-code.

Figure 3A:
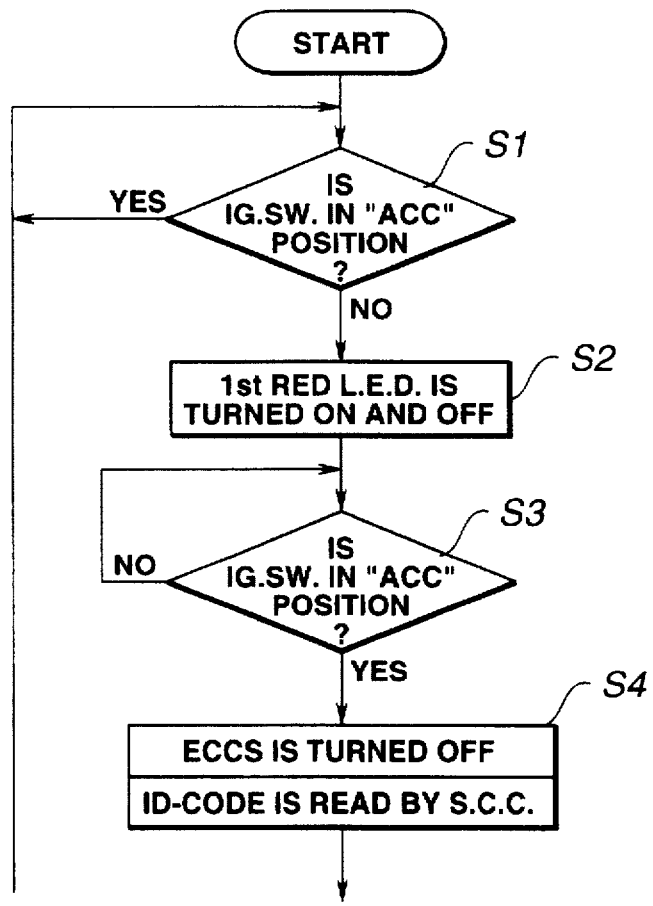
FIGS. 3A and 3B show a flowchart that depicts programmed operation steps carried out by a control unit employed in a second embodiment of the present invention.
Figure 3B:
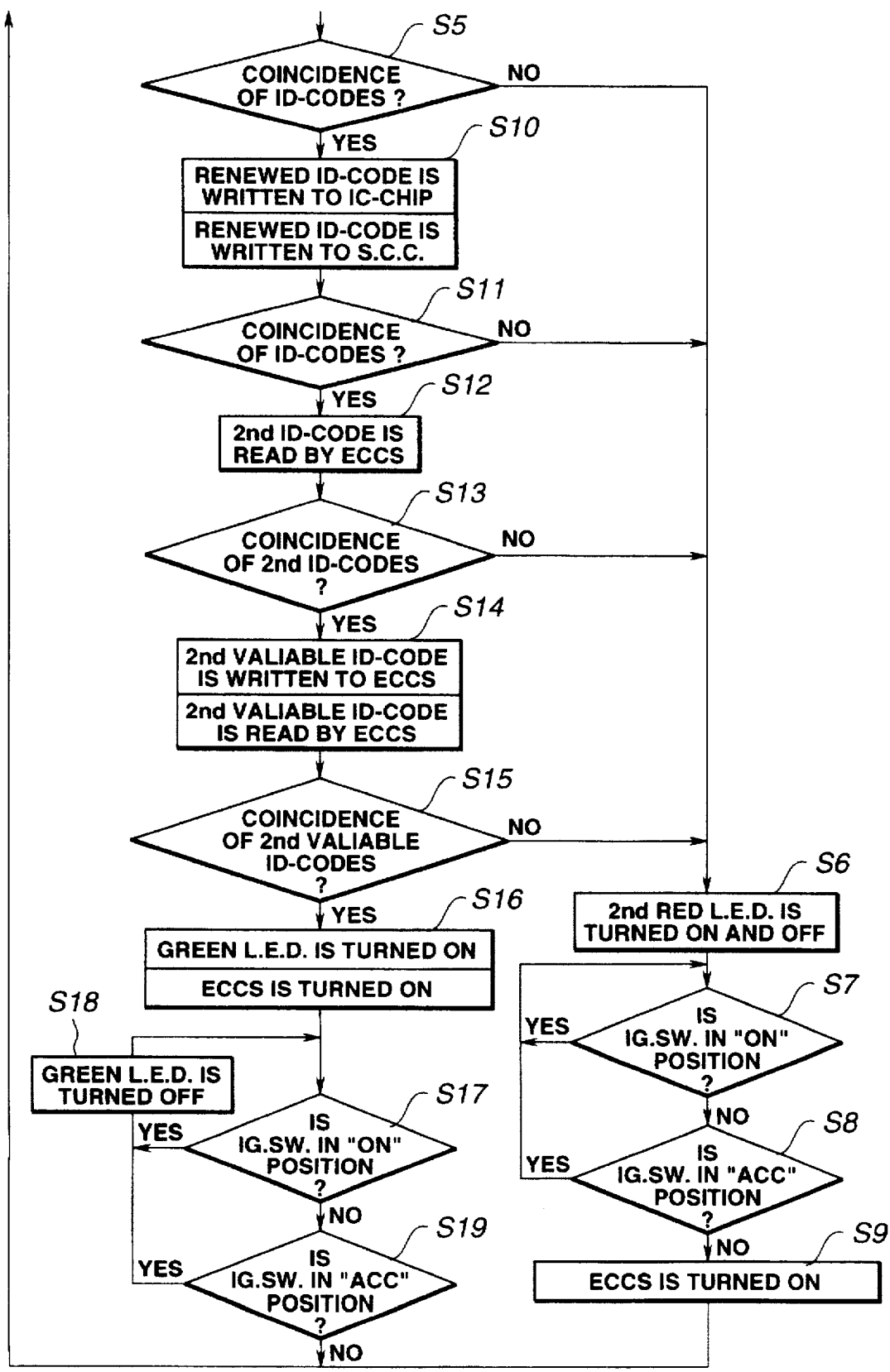

Referring to FIGS. 3A and 3B, there is shown a flowchart that depicts programmed operation steps carried out in a computer-aided control unit employed in a second embodiment of the present invention.

In this second embodiment, the inhibition of the engine starting is achieved by feeding an instruction signal to a computer (ECCS) which controls the engine. For achieving the inhibition, exchanges of ID-codes are made between the system control circuit of the communication module 8 and the "ECCS" which constitutes the immobilizer controller 9.

In the second embodiment, the operation steps from step S1 to step S11 are substantially same as those of the steps S1 to S11 of the above-mentioned first embodiment. However, in the second embodiment, the "ECCS" is turned OFF at step S4 and the "ECCS" is turned ON at step S9.

Furthermore, in the second embodiment, the operation steps from step S16 to S19 substantially correspond to those of the steps S12 to S15 of the first embodiment. However, in the second embodiment, the permission of the engine starting at step S16 is effected by turning the "ECCS" ON, while in the first embodiment, the permission (S12) is effected by deenergizing the three relay switches.

In the second embodiment, steps S12 to S15 are provided, whose corresponding steps are not provided in the first embodiment.

That is, if, at step S11 it is judged that the renewed variable ID-code from the IC-chip 4 coincides with the renewed variable ID-code directly written to the judging part, the operation flow goes to step S12. At this step S12, a second ID-code written in a memorizing part of the "ECCS" is transmitted to the system control circuit and the second ID-code is read by a second judging part of the system control circuit. Then, the operation flow goes to step S13. At this step, the second judging part judges whether or not the second ID-code transmitted from the "ECCS" coincides with a second ID-code memorized in a memorizing element of the second judging part. If NO, that is, when these two second ID-codes fail to coincide with each other, the operation flow goes to step S6 judging that any illegal action (for example, replacement of the "ECCS" or the like) would take place for car-theft. The engine is not operated or started.

While, if YES at step S13, the operation flow goes to step S14. At this step, a new second variable ID-code obtained from the random number generating circuit of the system control circuit is written to both the memorizing part of the "ECCS" and the second judging part of the system control circuit. Then, the second variable ID-code thus written to the memorizing part of the "ECCS" is instantly read by the second judging part. Then, at step S15, a judgment is carried out as to whether or not the second variable ID-code from the "ECCS" coincides with the new second variable ID-code directly written to the second judging part. If NO, that is, when the these two variable ID-codes fail to coincide, the operation flow goes to step S6 judging that any trouble would occur in any part of the device. Then, through the steps S7 and S8, the operation flow goes to step S9 to turn the "ECCS" ON with the ignition switch 5 having been turned to "OFF" position. In this case, repairing of the damaged portion, which includes replacement of the "ECCS", is needed for starting the engine.

When all of the steps S5, S11, S13 and S15 answer YES, it is judged that a proper key is used and the renewal of the ID-code has been properly made. Thus, in this case, the operation flow goes to step S16.

It is to be noted that under this condition, the variable ID-code and the second variable ID-code, which are memorized in the IC-chip 4, the "ECCS" and the judging parts, are different from those set when an action for staring the engine was practically made. These renewed variable and second renewed variable ID-codes are subjected to the ID-coincidence judgment at steps S5 and S13 in a subsequent action for the engine starting.

At step S16, a green light emitting diode (LED(G)) mounted on the dashboard is turned ON and the "ECCS" is turned ON. As a result, the engine becomes ready for starting. Then, at step S17, a judgment is carried out as to whether or not the ignition switch 5 has come to "ON" position. If YES, the green light emitting diode (LED(G)) is turned OFF at step S18, letting the driver know that the engine starting has been practically made. Furthermore, if, at step S19, it is judged that the ignition switch 5 has come to "ACC" position, the green light emitting diode (LED(G)) is also turned OFF. When the ignition switch 5 is turned to "OFF" position, the operation flow goes back to step S1 through the steps S17 and S19.

Figure 4:
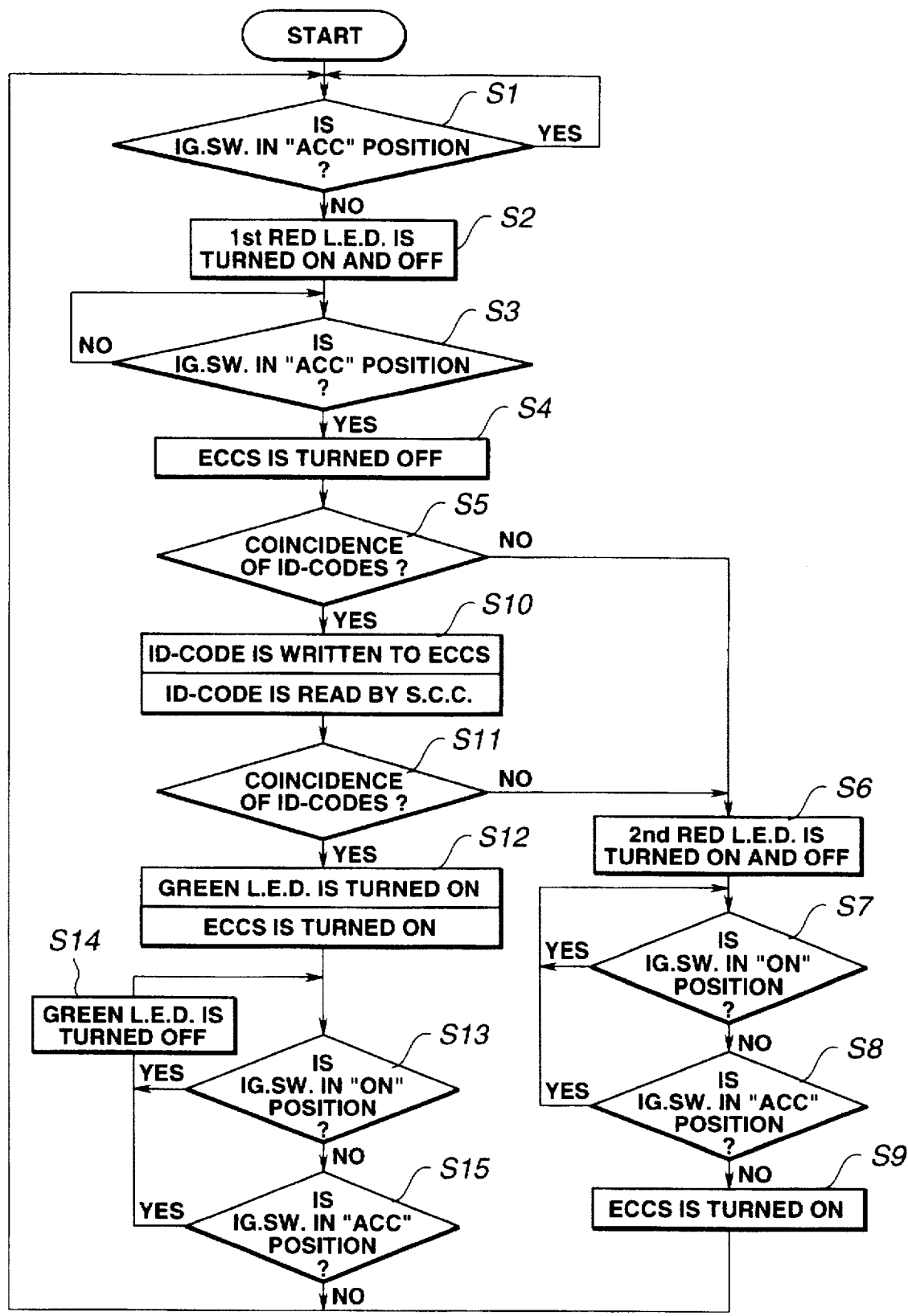
FIG. 4 is a flowchart that depicts programmed operation steps carried out by a control unit employed in a third embodiment of the present invention.

Referring to FIG. 4, there is shown a flowchart that depicts programmed operation steps carried out in a computer-aided control unit employed in a third embodiment of the present invention.

As will become apparent as the description proceeds, the third embodiment is similar to the above-mentioned first embodiment. That is, in the third embodiment, the fuel plump motor, the ignition switch 5 and the engine starter motor are directly controlled by the "ECCS".

Steps S1, S2 and S3 of this third embodiment are the same as the steps S1, S2 and S3 of the first embodiment and thus, description of them will be omitted.

If YES at step S3, that is, when the ignition switch 5 has come to "ACC" position, the operation flow goes to step S4. At this step S4, the ID-code transmitted from the IC-chip 4 is read by the judging part of the system control circuit and the ID-code is written to the memorizing part of the system control circuit. Furthermore, at step S4, the "ECCS" is turned OFF to inhibit the engine starting.

Then, at step S5, a judgment is carried out as to whether or not the ID-code thus read by the judging part coincides with the ID-code that has been memorized in the memorizing part. If NO, the operation flow goes to step S6 judging that any trouble would occur in the system. At step S6, a second red light emitting diode (2'nd LED(R)) is turned on and off, letting a driver know that the reading of the ID-code by the system control circuit has failed. In this failure case, the operation flow goes to step S9 when the steps S7 and S8 answer NO. At step S9, the "ECCS" is turned ON permitting the fuel pump motor, the ignition switch 5 and the engine start motor to take their operative conditions. However, since, under this condition, the ignition switch 5 has been turned back to "OFF" position by the key 1, the engine is not operated or started. In this case, reading of the ID-code is tried by using a master key, or repairing (or replacement) of the communication module 8 is needed.

While, if YES at step S5, that is, when it is judged that the ID-code read by the judging portion coincides with the memorized ID-code, the operation flow goes to step S10 to write the ID-code to the "ECCS" At this time, an ID-code identical to the ID-code written to the "ECCS" is memorized in the memorizing part of the system control circuit.

Although the ID-code to be written to the "ECCS" may be the same as the ID-code transmitted from the IC-chip 4, it is preferable to use a different ID-code for the "ECCS" to increase the car-theft prevention effect. In this case, the system control circuit should be equipped with a random number generating circuit.

At step S10, the ID-code written to the "ECCS" is instantly read by a second judging part of the system control circuit. Then, at step S11, judgment is carried out as to whether or not the ID-code memorized in the memorizing part coincides with the ID-code read by the second judging part. If NO, the operation flow goes to step S6 judging that any trouble would occur. At step S6, the second red light emitting diode (2'nd LED(R)) is turned on and off letting a driver know that the reading of the ID-code by the "ECCS" has failed. In this failure case, the operation flow goes to step S9 when the steps S7 and S8 answer NO. At step S9, the "ECCS" is turned ON permitting the fuel pump motor, the ignition switch 5 and the engine start motor to take their operative conditions. However, since, under this condition, the ignition switch 5 has been turned to back to "OFF" position by the key 1, the engine is not operated or started. In this case, reading of the ID-code is tried by using a master key, or repairing (or replacement) of the "ECCS" is needed.

While, if YES at step S11, that is, when it is judged that the ID-code read by the second judging part of the "ECCS" coincides with the ID-code memorized in the memorizing part, the operation flow goes to step S12. At this step, a green light emitting diode (LED(G)) is turned on, letting the driver know that the reading of the ID-code to both the system control circuit and the "ECCS" has been made in order, and at the same time, the "ECCS" is turned ON. Under this condition, initialization of the communication module 8 and that of the "ECCS" have been completed, and the engine has become ready for starting.

Thus, as step S13, judgment is carried out as to whether the ignition switch 5 has come to "ON" position or not. If YES, the operation flow goes to step S14 to turn the green light emitting diode (LED(G)) off. If NO, the operation flow goes to step S15 to judge whether the ignition switch 5 has come to "ACC" position or not. If YES, the operation flow goes to step S14 to turn off the green light emitting diode (LED(G)). While, if NO at step S15, the operation flow goes back to step S1, judging that the engine starting has not taken place or the engine has stopped after the starting.

In the following, advantages of the above-mentioned first, second and third embodiments of the present invention will be described.

(1) Because of the above-mentioned unique arrangement for inhibiting an illegal engine starting, the possibility of car-theft is minimized. That is, even when the ID-code is decoded or known by an outsider at a certain point of time, he or she can not start the engine by using the illegally obtained ID-code so long as the engine has been started at least one time by using a proper key thereafter.

(2) The IC-chip 4 embedded in the key is very low in cost as compared with a transmitter embedded in a key used in a conventional remote control type door lock system.

(3) There is no need of providing the key with a battery. That is, energization of the IC-chip 4 is induced by the electromagnetic wave that is emitted from the antenna 7 under operation of a battery mounted in the vehicle body.

(4) The radio communication between the IC-chip 4 and the antenna 7 needs only 2 to 3 cm in distance. Thus, the communication is achieved with a radio wave of very low intensity. Thus, the possibility of permitting an outsider to intercept the radio wave is quite small.

In the second and third embodiments, in order to practically use duplicate keys, the judging parts are designed to memorize ID-codes by the number of the duplicate keys (more specifically, the number plus one for a master key). When the engine starting is intended by one of the duplicate keys, only the ID-code possessed by the key is renewed and the other ID-codes are kept unchanged. For achieving this, the IC-chip 4 of each duplicate key is designed to issue its own discrimination code as well as the ID-code.

Figure 5:
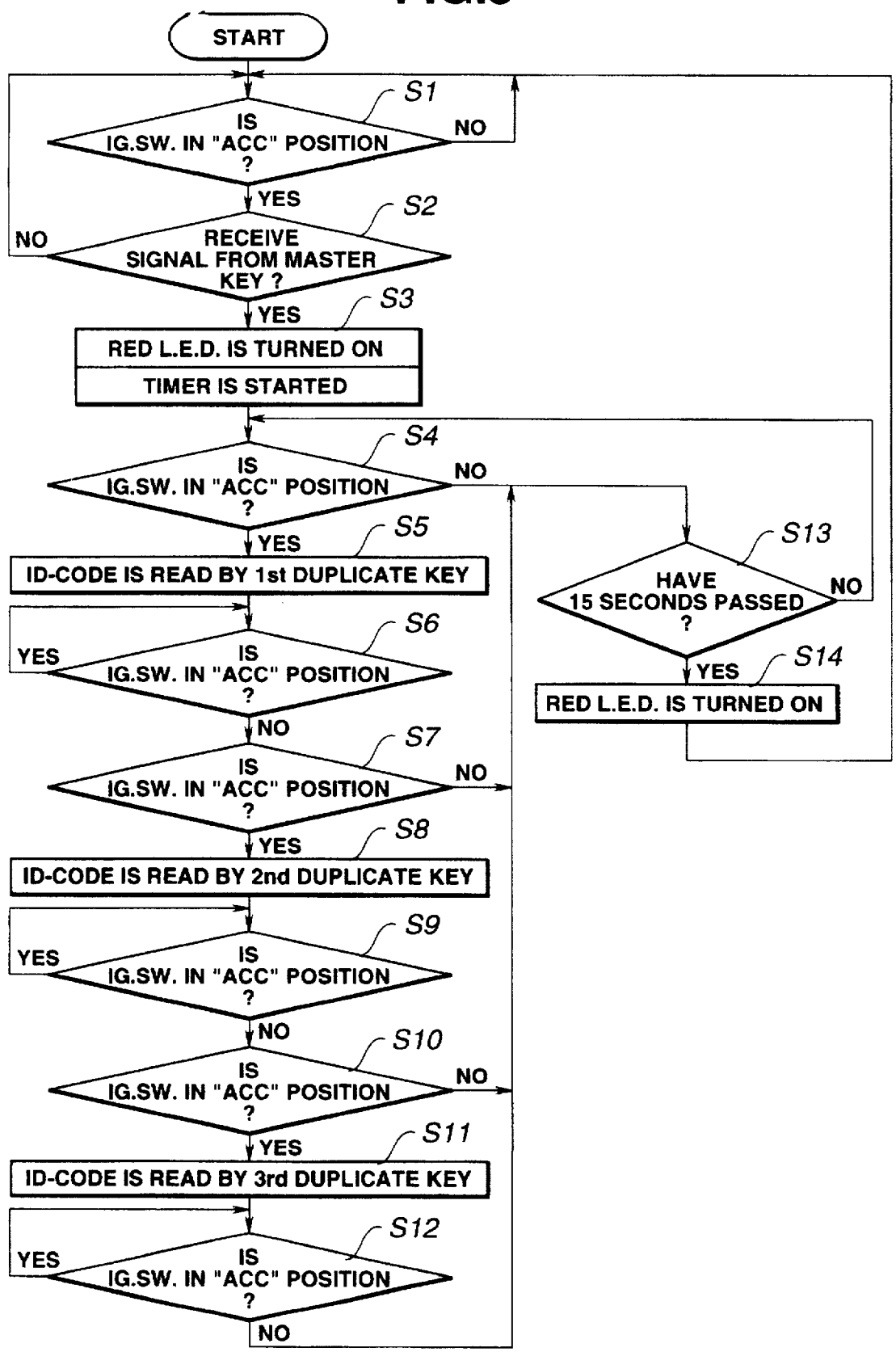
FIG. 5 is a flowchart that depicts programmed operation steps carried out in the third embodiment when an ID-code of a master key is copied into a duplicate key.

In the following, a process for making a plurality (three in the illustrated example) of the duplicate keys from the master key will be described with reference to the flowchart of FIG. 5.

In the IC-chip 4 possessed by the master key, there have been memorized various types of information that are used for initializing the communication module 8 and the "ECCS". In fact, for facilitation of key management, the communication module 8 and the "ECCS" are not initialized at the time when the vehicle is forwarded from the car factory. That is, the initialization of them is effected by the owner of the vehicle when he or she drives the vehicle for the first time.

For making the duplicate keys, at first, the master key is put into the key cylinder 6 and manipulated to turn the ignition switch 5 to "ACC" position. With this, the ID-code memorized in the IC-chip 4 of the master key is transmitted to the communication module 8. Within a given time (for example 15 seconds), the ignition switch 5 is turned back to "OFF" position and drawn from the key cylinder 6. Then, one blank duplicate key is put into the key cylinder 6 and manipulated to turn the ignition switch 5 to "ACC" position. With this, the ID-code in the communication module 8 is transmitted to the IC-chip of the duplicate key. By repeating this process, many duplicate keys can be made.

That is, at first, the master key is put into the key cylinder 6 and manipulated to turn the ignition switch 5 to "ACC" position. With this, from the IC-chip 4 of the master key, there emits a signal which carries a predetermined ID-code. If, at step S1, it is judged that ignition switch 5 has come to "ACC" position, the operation flow goes to step S2. At this step, a judgment is carried out as to whether or not the communication module 8 has received the signal. If YES, the operation flow goes to step S3. At this step S3, a red light emitting diode (LED(R)) mounted on the dashboard of the vehicle is turned ON and at the same time a timer is started. Within a given time (for example 15 seconds) counted by the timer, the ignition switch 5 is turned back to "OFF" position and the master key is drawn from the key cylinder 6. Then, a first blank duplicate key is put into the key cylinder 6 and manipulated to turn the ignition switch 5 to "ACC" position. With this, step S4 issues YES, and the operation flow goes to step S5. At this step S5, the ID-code in the communication module 8 is transmitted to and read by the IC-chip 4 of first blank duplicate key. Then, the ignition switch 5 is turned back to "OFF" position (step S6) and the first duplicate key which is thus useful is drawn from the key cylinder 6. Then, a second black duplicate key is put into the key cylinder and manipulated to turn the ignition switch 5 to "ACC" position (step S7). With this, the operation flow goes to step S8 and thus the ID-code in the communication module 8 is transmitted to and read by the IC-chip 4 of the second blank duplicate key. Then, the ignition switch 5 is turned back to "OFF" position and the useful second duplicate key is drawn from the key cylinder 6. By carrying out the same process (steps S9, S10 and S11), a useful third duplicate key can be made. If NO is issued from one of the steps S4, S7, S9 and S12, the operation flow goes to step S13. At this step, a judgment is carried out as to whether or not a predetermined time (for example, 15 seconds) has passed from the time when the ignition switch 5 was returned back to "OFF" position. If YES, the operation flow goes to step S14 to turn a red light emitting diode (LED(R)) ON and goes back to step S1.

What is claimed is:

1. An anti-theft protection device for a motor vehicle, comprising:

a key having an IC-chip embedded therein;

a first structure mounted in said motor vehicle, said first structure including an ignition switch that can be turned by said key to an "OFF" position, an "ACC" position and an "ON" position;

an antenna mounted on said first structure near said ignition switch;

a communication module mounted on said first structure to provide a radio communication between the IC-chip of said key and said antenna; and an immobilizer controller mounted on said first structure to determine, in accordance with an instruction signal issued from said communication module, whether or not said engine should be started, wherein said communication module includes an electric field generating circuit that energizes the IC-chip of said key by causing said antenna to emit an electromagnetic wave, a transmitting/receiving circuit which carries out exchange of ID-codes with said IC-chip through said antenna, and a system control circuit that controls both said electric field generating circuit and said transmitting/receiving circuit, and wherein said system control circuit causes said electric field generating circuit to make said antenna emit the electromagnetic wave when said ignition switch is turned to the "ACC" position by said key, and said system control circuit issues an engine start permitting signal to said immobilizer controller to permit said engine to start only when an ID-code received by said transmitting/receiving circuit from said IC-chip coincides with an ID-code previously memorized in said system control circuit, and wherein said system control circuit transmits, with an aid of said transmitting/receiving circuit, a new ID-code to said IC-chip to write the new ID-code to said IC-chip and memorizes the new ID-code in said system control circuit.

2. An anti-theft protection device as claimed in claim 1, in which said key comprises:
   a work portion which is to be inserted into a key cylinder of said ignition switch; and
   a grip portion connected to one end of said work portion, said grip portion having said IC-chip embedded therein.

3. An anti-theft protection device as claimed in claim 1, in which said electric field generating circuit of said communication module generates an electric power in a power part of said IC-chip by emitting the electromagnetic wave from said antenna.

4. An anti-theft protection device as claimed in claim 1, in which said immobilizer controller controls at least one of a fuel pump motor, the ignition switch and a starter motor in accordance with the instruction signal issued from said system control circuit.

5. An anti-theft protection device as claimed in claim 4, in which said immobilizer controller establishes operative conditions of said fuel pump motor, the ignition switch and the engine starter motor when said system control circuit issues the engine start permitting signal.

6. An anti-theft protection device as claimed in claim 1, in which said system control circuit renews the ID-code written to said IC-chip and memorized therein, each time an action for starting the engine is carried out.

7. In an anti-theft protection device for a motor vehicle, said device comprising a key having an IC-chip embedded therein; a first structure mounted in said motor vehicle, said first structure including an ignition switch that can be turned by said key to an "OFF" position, an "ACC" position and an "ON" position; an antenna mounted on said first structure near said ignition switch; a communication module mounted on said first structure to provide a radio communication between the IC-chip of said key and said antenna; and an immobilizer controller mounted on said first structure to determine, in accordance with an instruction signal issued from said communication module, whether or not an engine of said motor vehicle should be started, wherein said communication module includes an electric field generating circuit that energizes the IC-chip of said key by causing said antenna to emit an electromagnetic wave, a transmitting/receiving circuit that carries out exchange of ID-codes with said IC-chip through said antenna, and a system control circuit that controls both said electric field generating circuit and said transmitting/receiving circuit, and wherein said system control circuit issues an engine start permitting signal to said immobilizer controller to permit said engine to start only when, with the ignition switch having been turned to said "ACC" position by said key to cause said electric field generating circuit to energize said IC-chip, an ID-code received by said transmitting/receiving circuit from said IC-chip coincides with an ID-code previously memorized in said system control circuit,
   a method of initializing said anti-theft protection device, said method comprising the steps of:
   (a) preparing a given key having an IC-chip fixed thereto, said IC-chip having a given ID-code written thereto;
   (b) mounting said communication module on said motor vehicle without permitting said system control circuit to memorize the given ID-code;
   (c) turning said ignition switch to said "ACC" position by using said key thereby to transmit the given ID-code of the IC-chip of said key to said transmitting/receiving circuit;
   (d) permitting said system control circuit to memorize said given ID-code therein; and
   (e) removing said key from said ignition switch.

8. A method of initializing said anti-theft protection device as claimed in claim 7, wherein said given key is a master key having an IC-chip fixed thereto, said IC-chip having two different types of ID-codes memorized therein.

9. An anti-theft protection device as claimed in claim 1, wherein said key further comprises memorizing means for memorizing said new ID-code transmitted from said system control circuit.

10. An anti-theft protection device as claimed in claim 9, wherein, after said key has memorized said new ID-code by said memorizing means, said key outputs said new ID-code in response to all future energizing by said electric field generating circuit.

11. A method of initializing said anti-theft protection device as claimed in claim 7, further comprising the steps of:
   (f) inserting, into said ignition switch, a duplicate key having an IC-chip affixed thereto;
   (g) transmitting said given ID-code from said system control circuit to said duplicate key; and
   (h) memorizing, in said IC-chip of said duplicate key, said given ID-code,
   wherein said duplicate key is programmed to start said engine as a result thereof.

12. A method of initializing said anti-theft protection device as claimed in claim 8, wherein said two different types of ID-codes include a first type of ID-code that cannot be modified by said system control circuit and that uniquely identifies the given key, and a second type of ID-code that can be modified by said system control circuit, and
   wherein both said first type of ID-code and said second type of ID-code are used by said anti-theft protection device to determine whether to allow start of said engine.

13. A method of initializing said anti-theft protection device as claimed in claim 12, wherein said IC-chip of said duplicate key has memorized therein said first type of ID-code unique to said duplicate key, as well as said second type of ID-code.

14. A method of initializing said anti-theft protection device as claimed in claim 11, wherein the step (f) includes the step of turning said ignition switch to the "ACC" position, and
   wherein the step (e) must be performed within a preset time with respect to the step (c) in order to allow the duplicate key to be programmed.

* * * * *